United States Patent [19]

Weirauch, Jr.

[11] Patent Number: 4,628,038
[45] Date of Patent: Dec. 9, 1986

[54] WATER RESISTANT GLASS FIBERS

[75] Inventor: Douglas A. Weirauch, Jr., Murrysville, Pa.

[73] Assignee: Owens-Corning Fiberglas Corporation, Toledo, Ohio

[21] Appl. No.: 749,322

[22] Filed: Jun. 27, 1985

[51] Int. Cl.$^4$ .............................................. C03C 13/00
[52] U.S. Cl. ........................................ 501/35; 501/38; 501/59; 501/66
[58] Field of Search .................. 501/35, 38, 59, 70, 501/66

[56] References Cited

U.S. PATENT DOCUMENTS 2,308,857  1/1943  Bowes ................................. 501/35
2,571,074  10/1951  Tiede et al. ....................... 501/35
4,510,252  4/1985  Potter ................................ 501/35

FOREIGN PATENT DOCUMENTS 57-3736  1/1982  Japan ................................. 501/38

Primary Examiner—Helen M. McCarthy
Attorney, Agent, or Firm—Ronald C. Hudgens; Robert F. Rywalski; Debra L. Pawl

[57] ABSTRACT

A water resistant, devitrification resistant glass fiber consisting essentially of $SiO_2$, $Al_2O_3$, CaO, MgO, $B_2O_3$, $Na_2O$, and $F_2$ and/or $Fe_2O_3$ and/or $TiO_2$ and/or $K_2O$ and/or $SO_3$ in trace amounts, said glass fiber having a delta T of at least about 365° F. and a durability (% fiber weight loss at 96° C.) in water for 24 hours of less than about 0.9%.

2 Claims, No Drawings

WATER RESISTANT GLASS FIBERS

TECHNICAL FIELD

The present invention generally relates to glass compositions and more specifically to a devitrification and water resistant glass fiber composition.

BACKGROUND AND DISCLOSURE OF THE INVENTION

Various glass compositions suitable for forming glass fibers are known in the art, as discussed by K. L. Loewenstein in his book entitled "The Manufacturing Technology of Continuous Glass Fibers" (Elsevier Science Publishing Company, 1973), especially in Chapter IV on glass manufacturing. One desirable characteristic of such compositions is a resistivity to devitrify or crystallize during the fiber forming process. A devitrification resistant glass is one generally having a liquidus temperature significantly lower than the glass forming temperature, i.e., the temperature at which the glass has a viscosity (in poise) of log 2.5. This difference in temperature between the glass forming temperature and the liquidus temperature is called the "delta T." E-type glasses are an example of such a devitrification resistant glass.

U.S. Pat. No. 2,571,074 discloses a specific devitrification resistant E glass having the composition of 52–56% $SiO_2$, 12–16% $Al_2O_3$, 19–25% CaO and 8–13% $B_2O_3$. However, certain melting inefficiencies are realized when these formulations are employed. For example, the melting rates are slow and the resulting throughput values are low when these batch compositions are employed. Also, because an alkali component is lacking, these formulations are not amenable to electric melting, which generally enhances melting efficiencies. Additionally, batch costs of these glass compositions are high due to the high content of $B_2O_3$, the most expensive batch component.

C-type glasses, including the composition disclosed in U.S. Pat. No. 2,308,857, contain alkali and generally demonstrate good melting characteristics, however, they are not as durable in water as are other glasses, including E-type glases, and they also contain a substantial amount of $B_2O_3$ making the batch cost expensive.

The present invention provides an alumino-borosilicate glass composition containing alkali which is water resistant and devitrification resistant and which permits certain melting efficiencies to be realized when employing the formulations of the instant invention.

DISCLOSURE OF INVENTION

In accordance with the present invention, a devitrification resistant, water resistant alkali alumino-borosilicate glass fiber is provided which can be formed using conventional continuous glass fiber forming technology.

By employing the present formulations, improved melting efficiencies will be realized and lower batch cost will be incurred over previous conventional E-type and C-type glass formulations.

The glass compositions of the present invention demonstrate water durability characteristics at least as good as commercially available E-type glass and better than C-type glass, making them particularly suitable as reinforcements in a variety of processes requiring resistivity to water.

Glasses of the present formulations provide melts with advantageous viscosity characteristics making them amenable to conventional fiberizing methods. The melts exhibit substantially no devitrification or crystal formation during fiber formation and attenuation and have a delta T of at least about 365° F.

The low $B_2O_3$ content and good melting characteristics of the instant formulations will result in larger throughput values and will provide batch cost savings.

The alkali content renders the batch amenable to electric melting, thereby permitting improved melting rates to be realized.

Thus, in accordance with the present invention, there is provided a devitrification resistant, and water resistant, glass fiber consisting essentially of, in weight percent, about 52.6% to about 54.6% $SiO_2$, about 14.5% to about 17.5% $Al_2O_3$, about 15.5% to about 16.5% CaO, about 2% to about 3% MgO, about 6.5% to about 7.5% $Na_2O$, about 2.5% to about 4.5% $B_2O_3$, and 1% or less $F_2$. $TiO_2$, $Fe_2O_3$, $K_2O$ and $SO_3$ may be present in trace amounts, less than 2% combined, as impurities from the batch raw materials. The glass fiber is one having a delta T of at least about 365° F., and a durability (% fiber weight loss at 96° C.) in water for 24 hours of less than about 0.9%.

INDUSTRIAL APPLICABILITY

The above formulations can be formed into fibers using conventional technology whereby molten streams of glass are attenuated into continuous glass fibers and wound on conventional winders. Conventional glass forming raw materials, or batch, may be employed in forming the composition of the present invention.

Table 1 below summarizes the data for three glass compositions. Example 3 exemplifies the present inventive composition. Example 1 exemplifies an E-type glass composition as disclosed in U.S. Pat. No. 2,571,074, with a lower $B_2O_3$ content. Example 2 exemplifies a C-type glass composition as described in U.S. Pat. No. 2,308,857. The melting performance of the glasses were tested by placing the raw batches in a clay crucible and heating at conventional melting temperatures. The melts were examined at timed intervals for glass formation at the bottom of the crucible. The melting performance of the glass composition of the instant invention (Example 3) and C glass (Example 2) were compared to the melting performance of E glass (Example 1).

In comparing Examples 1 and 2 with Example 3, it will be noted that the glass composition of the instant invention demonstrated water durability comparable to the E-type glass and water durability was improved over C-type glass. The melting performance of Example 3 was better than Examples 1 and 2 and the $B_2O_3$ content was significantly lower than either the E-type or the C-type glass.

TABLE 1

|  | Example | | |
| --- | --- | --- | --- |
|  | 1 | 2 | 3 |
| $SiO_2$ | 55.1 | 65.3 | 53.3 |
| $Al_2O_3$ | 13.8 | 3.8 | 16.0 |
| CaO | 22.0 | 13.7 | 15.8 |
| MgO | 0.4 | 2.4 | 2.5 |
| $Na_2O$ | 0.4 | 8.9 | 7.0 |
| $B_2O_3$ | 6.2 | 5.5 | 3.0 |
| $F_2$ | 0.8 | 0 | 1.0 |
| $TiO_2$, $Fe_2O_3$, $K_2O$ and $SO_3$ | <2.0 | <1.0 | <2.0 |
| log 2.5 viscosity (°F.) | 2380 | 2310 | 2385 |
| liquidus (°F.) | 2000 | 2035 | 2015 |
| delta T | 380 | 275 | 370 |

TABLE 1-continued

| | Example | | |
|---|---|---|---|
| | 1 | 2 | 3 |
| durability (% fiber wt. loss at 96° C. when soaked for the time indicated) | | | |
| $H_2O$ 24 hrs. | 0.75 | 1.20 | 0.80 |
| Melting performance | standard | better | much better |

Although the invention has been described in terms of specific embodiments of a manner the invention may be practiced, this is by way of illustration only and the invention is not necessarily limited thereto since alternative embodiments and operating techniques will become apparent to those skilled in the art. Accordingly, modifications are contemplated which can be made without departing from the spirit of the described invention.

I claim:

1. A devitrification resistant and water resistant glass fiber consisting essentially of in approximate weight percent 52.6% to 54.6% $SiO_2$, 14.5% to 17.5% $Al_2O_3$, 15.5% to 16.5% CaO, 2% to 3% MgO, 6.5% to 7.5% $Na_2O$, 2.5% to 4.5% $B_2O_3$, and 1% or less $F_2$, and less than 2% $TiO_2$, $Fe_2O_3$, $K_2O$ and $SO_3$ combined, said glass fiber having a delta T of at least about 365° F. and a durability (% fiber weight loss at 96° C.) in water for 24 hours of less than about 0.9%, said glass having a viscosity, in poise, of 10 to the 2.5 power at a temperature of about 2345° F. to about 2385° F.

2. A devitrification resistant, water resistant glass fiber consisting essentially of in approximate weight percent 53.3% $SiO_2$, 16% $Al_2O_3$, 15.8% CaO, 2.5% MgO, 7.0% $Na_2O$, 3.0% $B_2O_3$, 1.0% $F_2$ and less than 2% $TiO_2$, $Fe_2O_3$, $K_2O$ and $SO_3$ combined, said glass fiber having a liquidus temperature of about 2015° F. and the glass fiber having a viscosity, in poise, of 10 to the 2.5 power at a temperature of about 2385° F., said fiber having the following water durability (% fiber weight loss at 96° C.):

(i) water for 24 hours—less than about 0.90%, said glass having a delta T of about 370° F.

* * * * *